(12) United States Patent
Ogata

(10) Patent No.: US 11,662,967 B2
(45) Date of Patent: May 30, 2023

(54) PRINTING SYSTEM, INFORMATION PROCESSING DEVICE, STORAGE MEDIUM STORING CONTROL PROGRAM, AND CONTROL METHOD

(71) Applicant: SHARP KABUSHIKI KAISHA, Sakai (JP)

(72) Inventor: Yoshitaka Ogata, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 17/327,103

(22) Filed: May 21, 2021

(65) Prior Publication Data

US 2021/0373828 A1   Dec. 2, 2021

(30) Foreign Application Priority Data

Jun. 2, 2020   (JP) ............... JP2020-095994

(51) Int. Cl.
*G06F 3/12* (2006.01)
(52) U.S. Cl.
CPC .......... *G06F 3/1255* (2013.01); *G06F 3/1204* (2013.01); *G06F 3/1225* (2013.01)
(58) Field of Classification Search
CPC combination set(s) only.
See application file for complete search history.

(56) References Cited

U.S. PATENT DOCUMENTS

| | | | | |
|---|---|---|---|---|
| 2006/0238777 A1* | 10/2006 | Anno | ................. | H04N 1/33369 358/1.1 |
| 2009/0231609 A1* | 9/2009 | Chipchase | ............ | G06F 3/1273 358/1.15 |
| 2010/0281476 A1* | 11/2010 | Ebi | ......................... | H04N 1/00 717/174 |
| 2011/0063645 A1* | 3/2011 | Sugino | ............... | G06K 15/1828 358/1.13 |
| 2013/0246777 A1* | 9/2013 | Fukasawa | ............. | G06F 21/608 713/1 |
| 2020/0089443 A1* | 3/2020 | Kashiwagi | ........... | G06F 3/1288 |
| 2021/0365222 A1* | 11/2021 | Kikuchi | ................ | G06F 3/1285 |

FOREIGN PATENT DOCUMENTS

JP   2013-190897 A   9/2013

* cited by examiner

*Primary Examiner* — Helen Zong
(74) *Attorney, Agent, or Firm* — ScienBiziP, P.C.

(57) ABSTRACT

A printing system includes an image forming apparatus and an information processing device. The image forming apparatus stores custom data indicating a setting value of a printing condition that can be achieved by the own apparatus. The information processing device includes a CPU. The CPU causes the information processing device to acquire custom data stored in the image forming apparatus, and a standard printing condition for a printer driver is set according to the custom data.

5 Claims, 13 Drawing Sheets

FIG. 4

CONDITION SETTING SCREEN 100

| COLOR MODE | SINGLE-SIDED PRINTING/ DOUBLE-SIDED PRINTING |
|---|---|
| MONOCHROME ▽ | SINGLE-SIDED PRINTING ▽ |
| PAPER SIZE | PUNCHING |
| A4 ▽ | NO PUNCHING ▽ |
| STAPLING | PAPER FOLDING |
| NO STAPLING ▽ | NO FOLDING ▽ |

START

FIG. 5

| CUSTOM DATA | IMAGE FORMING APPARATUS A (COLOR/ MONOCHROME) | IMAGE FORMING APPARATUS B (MONOCHROME) |
|---|---|---|
| CUSTOM DATA A (ACQUIRE) | COLOR | COLOR |
| CUSTOM DATA B (STORE) | COLOR | MONOCHROME |

ACQUISITION DESTINATION SELECTION SCREEN 120

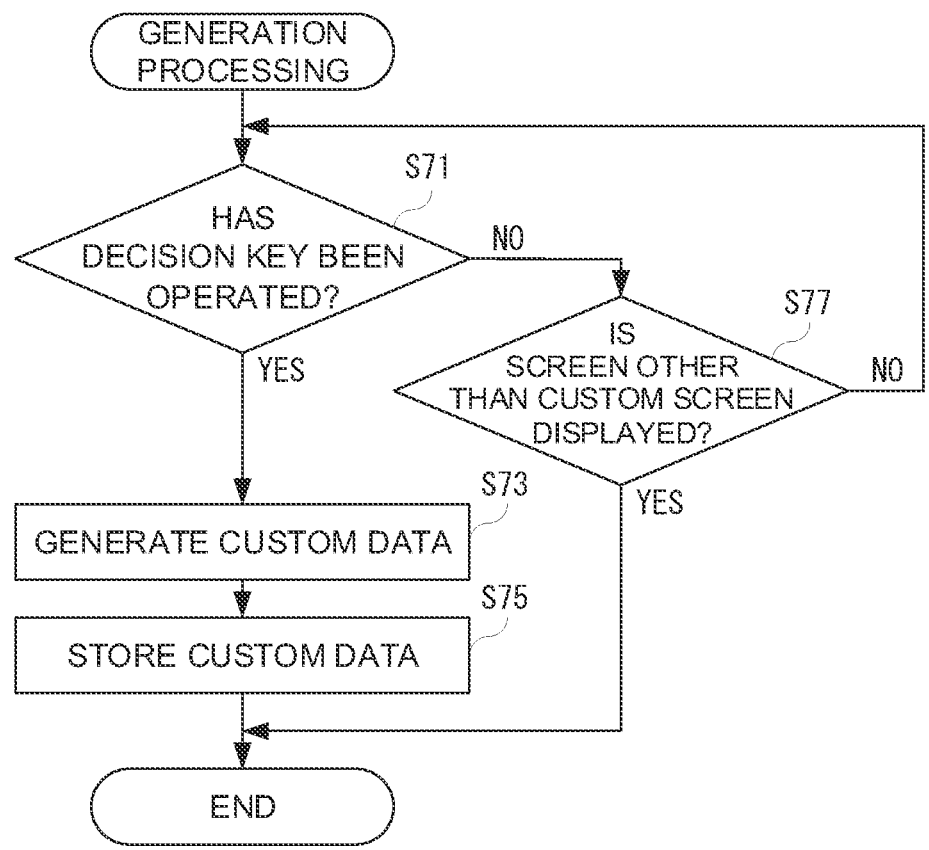

PRINTING SYSTEM, INFORMATION PROCESSING DEVICE, STORAGE MEDIUM STORING CONTROL PROGRAM, AND CONTROL METHOD

BACKGROUND OF THE INVENTION

Field of the Invention

The present invention relates to a printing system, an information processing device, a storage medium storing a control program, and a control method, and more particularly relates to a printing system, an information processing device, a storage medium storing a control program, and a control method in which, for example, a printer driver can be installed.

Description of the Background Art

Japanese Unexamined Patent Application Publication No. 2013-190897 discloses one example of this kind of background art. In the technique disclosed in Japanese Unexamined Patent Application Publication No. 2013-190897, when a printer driver is installed in a client PC, customization data indicating a setting pattern of a printing condition generated in advance by a customization tool included in the client PC are stored in a registry of the client PC, and a user operation is accepted via a graphical user interface (GUI) in which a printing condition frequently used by a user is set in advance by the customization data.

SUMMARY OF THE INVENTION

In the background art, a standard value of a printing condition of a printer driver is freely set by a customization tool. Therefore, a standard printing condition is freely set in the printer driver to be installed in an information processing device. However, the standard printing condition may not be associated with a feature of printed matter that cannot be achieved by an image forming apparatus. When an image is printed based on the standard printing condition, an error may occur, or printed matter may be discharged based on a printing condition different from the user's intention. Thus an inconvenience may occur for the user. Therefore, it takes time and effort to eliminate the inconvenience.

In view of the above, a main object of the present invention is to provide a novel printing system, information processing device, storage medium storing control program, and control method.

Another object of the present invention is to provide a printing system, an information processing device, a storage medium storing a control program, and a control method that can save time and effort for eliminating an inconvenience, when a printer driver is installed.

A first invention is directed to a printing system provided with an image forming apparatus and an information processing device. The image forming apparatus includes a first communicator that communicates with the information processing device, and a first storage that stores a setting value of a printing condition that can be achieved by the own apparatus. The information processing device includes a second communicator that communicates with the image forming apparatus, an installer that installs a printer driver for controlling the image forming apparatus, a data acquirer that acquires the setting value from the image forming apparatus, when the printer driver is installed by the installer, a second storage that stores the setting value acquired by the data acquirer, and a setter that sets a standard value of a printing condition for the printer driver according to the setting value stored in the second storage.

A second invention is directed to a printing system provided with an image forming apparatus and an information processing device. A control method of the image forming apparatus includes (a) communicating with the information processing device, and (b) storing a setting value of a printing condition that can be achieved by the own apparatus. A control method of the information processing device includes (c) communicating with the image forming apparatus, (d) installing a printer driver for controlling the image forming apparatus, (e) acquiring the setting value from the image forming apparatus, when the printer driver is installed in (d), (f) storing the setting value acquired in (e), and (g) setting a standard value of a printing condition for the printer driver according to the setting value stored in (f).

A third invention is directed to an information processing device communicably connected to an image forming apparatus that stores a setting value of a printing condition that can be achieved by the own apparatus. The information processing device includes: a communicator that communicates with the image forming apparatus; an installer that installs a printer driver for controlling the image forming apparatus; a data acquirer that acquires the setting value from the image forming apparatus, when the printer driver is installed by the installer; a storage that stores the setting value acquired by the data acquirer; and a setter that sets a standard value of a printing condition for the printer driver according to the setting value stored in the storage.

A fourth invention is directed to a storage medium storing a control program causing a processor of an information processing device communicably connected to an image forming apparatus that stores a setting value of a printing condition that can be achieved by the own apparatus to execute a communication step of communicating with the image forming apparatus; an installation step of installing a printer driver for controlling the image forming apparatus; a data acquisition step of acquiring the setting value from the image forming apparatus, when the printer driver is installed in the installation step; a storage step of storing the setting value acquired in the data acquisition step; and a setting step of setting a standard value of a printing condition for the printer driver according to the setting value stored in the storage step.

A fifth invention is directed to a control method of an information processing device communicably connected to an image forming apparatus that stores a setting value of a printing condition that can be achieved by the own apparatus. The control method includes: (a) communicating with the image forming apparatus; (b) installing a printer driver for controlling the image forming apparatus; (c) acquiring the setting value from the image forming apparatus, when the printer driver is installed in (b); (d) storing the setting value acquired in (c); and (e) setting a standard value of a printing condition for the printer driver according to the setting value stored in (d).

The present invention is able to save time and effort involved in eliminating an inconvenience, when a printer driver is installed.

The above object, other objects, features, and advantages of the present invention will be more apparent from the following detailed description of embodiments with reference to the drawings.

BRIEF DESCRIPTION OF THE DRAWINGS

FIG. 4 is a diagram illustrating one example of a condition setting screen to be displayed on a display of the information processing device.

FIG. 5 is a diagram illustrating a relationship between custom data and the image forming apparatus.

FIG. 16 is a flowchart illustrating one example of generation processing of a CPU in the image forming apparatus according to the second embodiment.

DESCRIPTION OF THE PREFERRED EMBODIMENTS

First Embodiment

Figure 1:
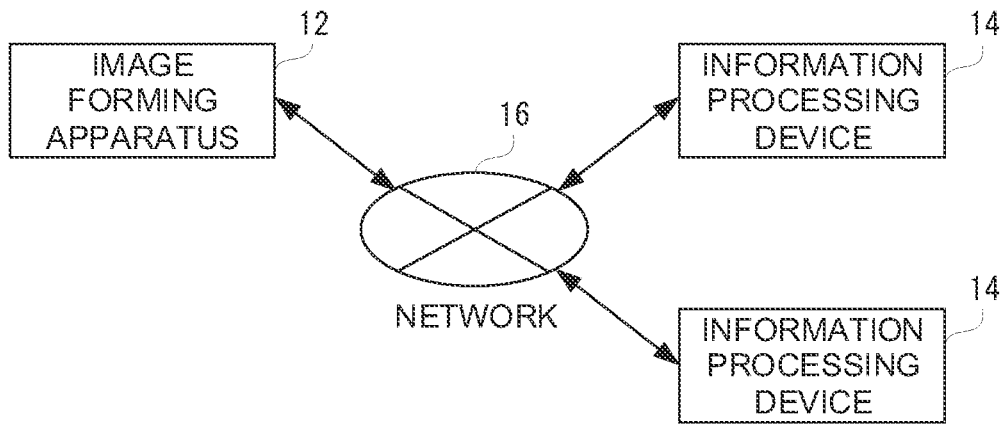
FIG. 1 is a diagram illustrating one example of a configuration of a printing system.

FIG. 1 is a diagram illustrating one example of a configuration of a printing system 10 according to a first embodiment. As illustrated in FIG. 1, the printing system 10 includes an image forming apparatus 12 and a plurality of information processing devices 14.

The image forming apparatus 12 is a multifunction device having a copying function (copy function), a printer function, a scanner function, a facsimile function, and the like. However, the image forming apparatus 12 is also applicable to another image forming apparatus such as a printing device (printer).

The information processing device 14 is a desktop PC, a notebook (laptop) PC, a tablet PC, or the like.

The image forming apparatus 12 and the plurality of information processing devices 14 are connected via a network 16 constituted of the Internet. The network 16 may be constituted of a telephone network (a public telephone network or a mobile phone communication network) and the Internet. Further, the image forming apparatus 12 and the information processing device 14 may be directly connected.

Figure 2:
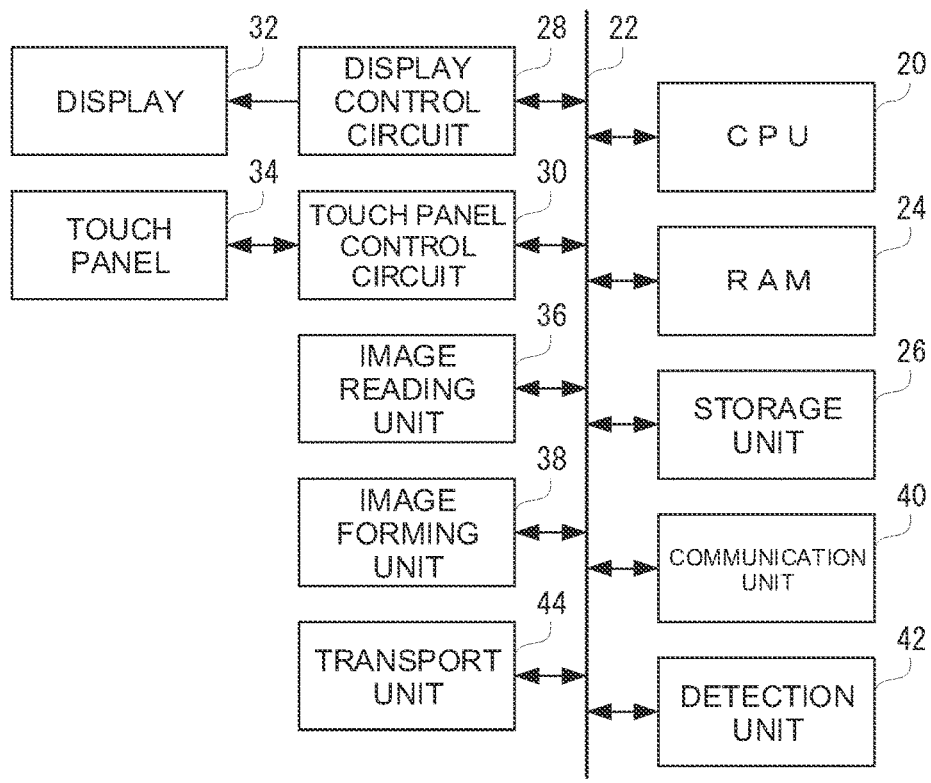
FIG. 2 is a block diagram illustrating an electrical configuration of an image forming apparatus.

FIG. 2 is a block diagram illustrating an electrical configuration of the image forming apparatus 12 illustrated in FIG. 1. As illustrated in FIG. 2, the image forming apparatus 12 includes a CPU 20. The CPU 20 is connected to an RAM 24, a storage unit 26, a display control circuit 28, a touch panel control circuit 30, an image reading unit 36, an image forming unit 38, a communication unit 40, a detection unit 42, and a transport unit 44 via a bus 22.

Further, the image forming apparatus 12 includes a display 32 and a touch panel 34, the display control circuit 28 is connected to the display 32, and the touch panel control circuit 30 is connected to the touch panel 34.

The CPU 20 performs the overall control of the image forming apparatus 12. The RAM 24 is used as a work area and a buffer area of the CPU 20.

The storage unit 26 is a main storage device of the image forming apparatus 12, and a non-volatile memory such as an HDD and an EPPROM is used. Further, the storage unit 26 may be configured to include the RAM 24. Data about a control program for controlling an operation of each part of the image forming apparatus 12 by the CPU 20, data of images (display images) for various screens, data necessary for executing the control program, and the like are stored in the storage unit 26.

The display control circuit 28 includes a GPU, a VRAM, and the like, and under the instruction of the CPU 20, the GPU generates, in the VRAM, display images for displaying various screens on the display 32 by using image generation data 404b (see FIG. 7) stored in the RAM 24, and outputs the generated display images to the display 32. For example, an LCD, an electro-luminescence (EL) display or the like can be used as the display 32. This also applies to a display 72 (see FIG. 3) to be described later.

The touch panel control circuit 30 applies a voltage or the like, necessary for the touch panel 34, detects a touch operation (user operation) within a valid touch area of the touch panel 34, and outputs, to the CPU 20, touch coordinate data indicating a position of the touch input.

The touch panel 34 is a general-purpose touch panel, and any method such as a capacitance method, an electromagnetic induction method, a resistance film method, and an infrared method can be used. As the touch panel 34, a capacitance type touch panel is used, and the touch panel 34 is provided on a display surface of the display 32. However, a touch panel display in which the display 32 and the touch panel 34 are integrally formed may be used.

The image reading unit 36 includes a light source, a plurality of mirrors, an imaging lens, a line sensor, and the like. The image reading unit 36 guides light reflected from a document surface to the imaging lens by the plurality of mirrors. Then, the reflected light is formed on a light receiving element of the line sensor by the imaging lens. The line sensor detects brightness or chromaticity of the reflected light formed on the light receiving element, and generates a read image based on an image on the document surface, thereby inputting the read image. Further, as the line sensor, a complementary metal oxide semiconductor (CMOS), a charge coupled device (CCD), or the like is used.

The image forming unit 38 includes a photoconductor drum, a charging device, an exposure device, a developing device, a transfer device, a fixing device, and the like, and forms an image on a recording medium by a dry electrophotographic method. An input image is used as an image (output image) to be formed on the recording medium. Further, the input image includes a read image, an image (received image) transmitted from an external information processing device or the like. Further, the recording medium is not limited to recording paper made of paper, and a sheet other than paper such as an OHP film is also used.

Further, the image forming unit 38 includes four photoconductor drums, four charging devices, four developing devices, four intermediate transfer rollers, four cleaning devices, and the like for respective colors of Y (yellow), M (magenta), C (cyan), and K (black). Further, in this case, an image forming station including a photoconductor drum, a charging device, a developing device, an intermediate transfer roller, and a cleaning device is configured, and color image printing can be implemented.

The communication unit 40 includes a communication circuit to be connected to a communication module or the network 16 wiredly or wirelessly, and performs communication via the network 16 according to an instruction of the CPU 20. As one example, the communication unit 40 transmits/receives data according to a wired communication method in conformity with a communication standard such as Ethernet (registered trademark), a wireless communication method in conformity with a communication standard such as IEEE 802.11, or the like.

Further, the communication unit 40 includes an unillustrated external storage medium mounting unit to which various types of media as an unillustrated external storage medium can be mounted, and performs data transmission and reception to and from the medium mounted on the external storage medium mounting unit. The media referred to herein include semiconductor media such as secure digital (SD) memory cards and universal serial bus (USB) memories, and disc media such as compact discs (CDs) and digital versatile discs (DVDs).

The detection unit 42 includes a circuit and the like for detecting mounting of an optional device to the image forming apparatus 12 and dismounting of an optional device from the image forming apparatus 12.

The optional device is a device for applying processing to printed matter. For example, a punching unit for making holes in printed matter, a stapling unit for binding printed matter with staples, a paper folding unit for folding printed matter, and the like are exemplified.

Further, detection of mounting and dismounting an optional device is determined based on the presence or absence of communication with the optional device. Mounting and dismounting of an optional device may be detected based on a detection result of a sensor such as an optical sensor and a distance sensor. Since the method of detecting mounting and dismounting an optional device is well known, detailed description thereof is omitted.

The transport unit 44 includes a transport path, a transport roller, and the like for transporting paper placed on an unillustrated paper feed cassette and an unillustrated manual feed tray to a paper discharge tray via the transfer device, the fixing device, and the like included in the image forming unit 38.

Further, the transport unit 44 may include a transport path or the like for returning paper after single-sided printing to a transport path on the upstream side of the transfer device, the fixing device, and the like in the paper transport direction. In this case, double-sided printing can be implemented.

Figure 3:
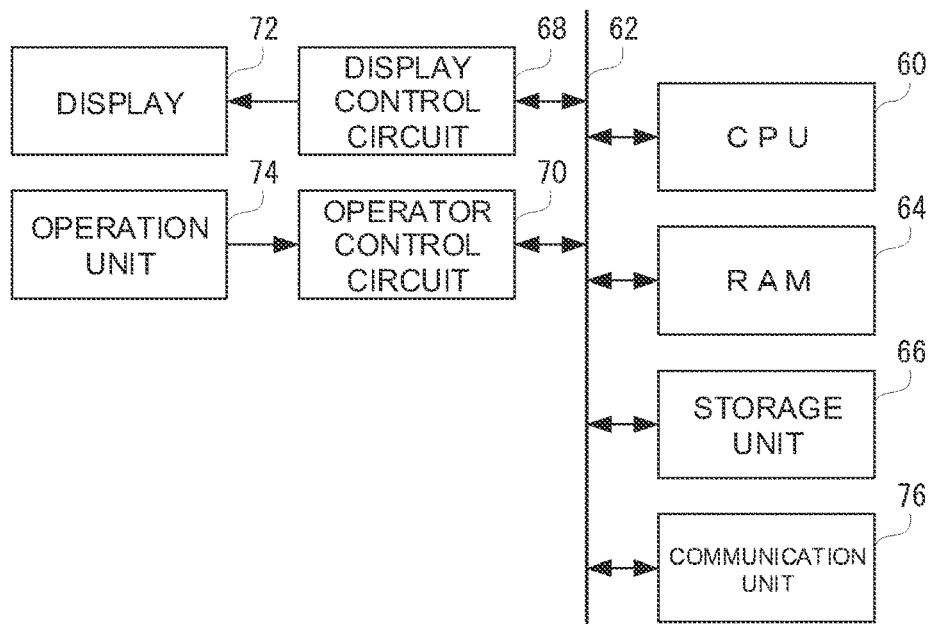
FIG. 3 is a block diagram illustrating an electrical configuration of an information processing device.

FIG. 3 is a block diagram illustrating an electrical configuration of the information processing device 14 illustrated in FIG. 1. As illustrated in FIG. 3, the information processing device 14 includes a CPU 60. The CPU 60 is connected to an RAM 64, a storage unit 66, a display control circuit 68, an operation unit control circuit 70, and a communication unit 76 via a bus 62.

Further, the information processing device 14 includes a display 72 and an operation unit 74, the display control circuit 68 is connected to the display 72, and the operation unit control circuit 70 is connected to the operation unit 74.

The CPU 60 performs the overall control of the information processing device 14. The RAM 64 is used as a work area and a buffer area of the CPU 60.

The storage unit 66 is a main storage device of the information processing device 14, and a non-volatile memory such as an HDD and an EPPROM is used. Further, the storage unit 66 may be configured to include the RAM 64. Data about a control program for controlling an operation of each part of the information processing device 14 by the CPU 60, data of images (display images) for various screens, data necessary for executing the control program, a printer driver, and the like are stored in the storage unit 66, as necessary.

The display control circuit 68 includes a GPU, a VRAM, and the like, and under the instruction of the CPU 60, the GPU generates, in the VRAM, display images for displaying various screens on the display 72 by using image generation data 504*b* (see FIG. 8) stored in the RAM 64, and outputs the generated display images to the display 72.

The operation unit control circuit 70 outputs, to the CPU 60, a signal or operation data according to an input operation (user operation) with respect to the operation unit 74.

Further, as the operation unit 74, for example, a mouse, a keyboard, a touch panel, and the like are used. When a touch panel is used as the operation unit 74, the touch panel is provided on a display surface of the display 72. Further, a touch panel display in which the display 72 and the operation unit 74 are integrally formed may be used.

Further, the communication unit 76 performs communication via the network 16 according to an instruction of the CPU 60, similarly to the communication unit 40. Further, in particular, for example, the communication unit 76 transmits print image data according to an instruction of the CPU 60.

Note that the electrical configurations of the image forming apparatus 12 illustrated in FIG. 2 and the information processing device 14 illustrated in FIG. 3 are merely one example, and the embodiment is not limited to the example.

In the printing system 10 as described above, when the information processing device 14 and the image forming apparatus 12 are connected, and a predetermined operation is accepted, a printer driver is installed in the information processing device 14.

The printer driver is a device driver of the image forming apparatus 12. Therefore, the image forming apparatus 12 can be said to be an image forming apparatus 12 controllable by the printer driver.

Further, in the printer driver to be installed in the information processing device 14, a standardized printing condition (standard printing condition) is set. The printing condition is a condition that is reflected in an operation of the image forming apparatus 12 at the time of printing. A feature of printed matter changes according to an operation of the image forming apparatus 12 at the time of printing. Therefore, the feature of the printed matter changes according to the printing condition. Specifically, a printing condition is associated with a feature of printed matter.

In addition, the printing condition includes a plurality of setting items (hereinafter, simply referred to as "setting items") associated with printing (associated with an operation of the image forming apparatus 12 at the time of printing). Further, the operation of the image forming apparatus 12 is determined by a setting value of each of the setting items. In other words, a feature of printed matter is determined by a setting value of each of the setting items.

In the printer driver, a standard setting value (standard value) is set for the setting value of each of the setting items. The standard value of each of the setting items can also be said to be a standard value of a printing condition. When the user performs a printing instruction, the setting value of each of the setting items can be desirably changed from the standard value.

Further, the setting items include, for example, a color mode, single-sided printing/double-sided printing, a paper size, punching, stapling, and paper folding.

The color mode is a setting item related to a color of an image, specifically, a color of an image to be printed on paper. For example, "black and white (monochrome)" and "color" can be set as the color mode.

When the color mode is set to "black and white", a black and white image is printed on paper. When the color mode is set to "color", a color image is printed on paper.

Single-sided printing/double-sided printing is a setting item related to a side of paper on which an image is printed. Single-sided printing/double-sided printing can be set to, for example, "single-sided printing" and "double-sided printing".

When single-sided printing/double-sided printing is set to "single-sided printing", an image is printed on one side of paper. When single-sided printing/double-sided printing is set to "double-sided printing", an image is printed on both sides of paper.

The paper size is a setting item related to a size of paper on which an image is printed. The paper size can be set to, for example, "A4", "A3", "B5", or the like.

When the paper size is set to "A4", an A4 size paper image is printed. The same is also applied when the size is set to another size.

Punching is a setting item related to whether punching is applied to printed matter. Punching can be set to, for example, "without processing" and "with processing". When punching is set to "without processing", printed matter is not punched. When punching is set to "with processing", punching is performed at a predetermined position of printed matter.

Stapling is a setting item related to whether stapling is applied to printed matter. Stapling can be set to, for example, "without processing", "with processing (binding at one position)", and "with processing (binding at two positions)". When stapling is set to "without processing", printed matter is not stapled. When stapling is set to "with processing (binding at one position), stapling is performed at a predetermined position of printed matter. When stapling is set to "with processing (binding at two positions)", stapling is performed at predetermined two positions of printed matter.

Paper folding is a setting item related to whether paper folding is applied to printed matter. Paper folding can be set to, for example, "without processing", "with processing (folded in half)", and "with processing (folded in three)". When paper folding is set to "without processing", printed matter is not folded. When paper folding is set to "with processing (folded in half)", printed matter is folded at a position where the length of paper in the longitudinal direction of the printed matter is divided into two equal parts. When paper folding is set to "with processing (folded in three), printed matter is folded at a position where the length in the longitudinal direction of the printed matter is divided into three equal parts.

Actually, a setting value associated with a setting content is set. For example, in the color mode, it is possible to set a setting value associated with "black and white (monochrome)" and a setting value associated with "color".

For setting a standard printing condition, original data indicating a setting value (original value) that is determined in advance by the developer are used. In the following, a series of processing until a standard printing condition is set according to original data are described.

Original data, a printer driver, and the like are stored in a predetermined file of a data format. When the information processing device 14 accepts a predetermined operation, the original data, the printer driver, and the like are expanded.

Further, when the original data, the printer driver, and the like are expanded, installation of the printer driver is started, and the original data are stored in the information processing device 14.

Further, when installation of the printer driver is completed, a standard printing condition for the printer driver is set according to the original data.

In other words, a standard value of a printing condition for a printer driver is set according to an original value. Specifically, a standard value of each setting item is set according to an original value.

For example, in the first embodiment, after a standard printing condition for a printer driver is set, an operation screen associated with the printer driver is displayed on the display 72 in response to accept of a predetermined operation by the information processing device 14.

The operation screen herein is a condition setting screen 100 (see FIG. 4) for setting a printing condition. However, as the condition setting screen 100 to be displayed on the display 72, the condition setting screen 100 associated with a standard printing condition is displayed.

FIG. 4 is one example of the condition setting screen 100. In the example illustrated in FIG. 4, for example, a standard value of the color mode is equivalent to a setting value associated with "monochrome".

It is also possible to use custom data instead of original data for setting a standard printing condition. The custom data are data indicating a setting value (custom value) that is optionally determined by a customization tool.

However, in order to set a standard printing condition by using custom data, it is necessary to store the custom data in the information processing device 14 in addition to original data, when a printer driver is installed.

When original data and custom data are stored in the information processing device 14, and installation of a printer driver is completed, a standard printing condition for the printer driver is set according to the custom data.

However, since a custom value can be freely set in a customization tool, a standard printing condition may be associated with a feature of printed matter that cannot be achieved by the image forming apparatus 12.

Further, if an image is printed based on a standard printing condition, when the standard printing condition is associated with a feature of printed matter that cannot be achieved by the image forming apparatus 12, an inconvenience occurs for the user.

For example, an error occurs. In addition, printed matter is discharged based on a printing condition different from a printing condition intended by the user.

Since a printing condition is associated with a feature of printed matter, a standard printing condition associated with a feature of printed matter that cannot be achieved by the image forming apparatus 12 can also be said to be a standard printing condition that cannot be achieved by the image forming apparatus 12.

Further, a standard printing condition associated with a feature of printed matter that can be achieved by the image forming apparatus 12 can also be said to be a standard printing condition that can be achieved by the image forming apparatus 12.

Further, a standard printing condition is freely set according to a custom value. In other words, a custom value can also be classified into either a custom value that can be achieved by the image forming apparatus 12 or a custom value that cannot be achieved by the image forming apparatus 12.

In the present embodiment, in order to avoid such an inconvenience, a standard value of a printing condition for a printer driver, in other words, a standard printing condition is set according to a custom value that can be achieved by the image forming apparatus 12.

First, in the printing system 10, custom data are stored in advance in the image forming apparatus 12.

However, a custom value indicated by the custom data is a custom value that can be achieved by the image forming apparatus 12.

In other words, in the present embodiment, a standard printing condition set according to a custom value stored in a certain image forming apparatus 12 is a standard printing condition that can be achieved by the image forming apparatus 12.

Further, in the image forming apparatus 12, when custom data are input to the image forming apparatus 12 from the outside via the communication unit 40, the custom data are stored in the image forming apparatus 12.

For example, custom data stored in a medium are input to the image forming apparatus 12 in response to connection of the medium storing the custom data to the image forming apparatus 12.

However, when custom data input to the image forming apparatus 12 indicate a custom value that cannot be achieved by the image forming apparatus 12, after the custom value that cannot be achieved by the image forming apparatus 12 is changed to a custom value that can be achieved by the image forming apparatus 12, the custom data are stored in the image forming apparatus 12. When the custom value indicates a custom value that can be achieved by the image forming apparatus 12, the custom value is not changed.

FIG. 5 is a diagram illustrating a relationship between custom data and the image forming apparatus 12. Custom data A are custom data before being stored in the image forming apparatus 12, and custom data B are custom data after having been stored in the image forming apparatus 12.

Further, an image forming apparatus A is an image forming apparatus 12 capable of printing a color image and a monochrome image, and an image forming apparatus B is an image forming apparatus 12 capable of printing a monochrome image.

As illustrated in FIG. 5, for example, custom data indicating a custom value associated with "color" are input to the image forming apparatus A and the image forming apparatus B.

Since the image forming apparatus A is an image forming apparatus 12 capable of printing a color image and a monochrome image, the custom data input to the image forming apparatus A are stored in the image forming apparatus A without changing the custom value.

On the other hand, since the image forming apparatus B is an image forming apparatus 12 capable of printing a monochrome image, the custom data input to the image forming apparatus B are stored in the image forming apparatus B after the custom value is changed. Specifically, the custom value associated with "color" is changed to a custom value associated with "monochrome".

Among the custom data stored in the image forming apparatus 12, custom data in use are latest custom data. In addition, unused custom data may be deleted from the image forming apparatus 12 as necessary.

Furthermore, in the image forming apparatus 12 according to the present embodiment, when a predetermined time (for example, 3 minutes) elapses after the optional device is dismounted from the image forming apparatus 12, it is determined whether the custom value indicated by the custom data is a custom value that can be achieved (cannot be achieved) by the image forming apparatus 12.

When the custom data indicate a custom value that cannot be achieved by the image forming apparatus 12, the custom value is changed as described above. Further, when the custom data indicate a custom value that can be achieved by the image forming apparatus 12, the custom value is not changed.

As far as the optional device is dismounted from the image forming apparatus 12 involved in maintenance, elimination of an error, or the like, the optional device may be mounted again to the image forming apparatus 12.

For example, if the custom value is changed immediately after the optional device is dismounted from the image forming apparatus 12, it takes time and effort to return the custom value to a state before the custom value is changed, after the optional device is mounted to the image forming apparatus 12.

In view of the above, in the present embodiment, the custom value is changed as necessary when a predetermined time (for example, 3 minutes) elapses after the optional device is dismounted from the image forming apparatus 12.

The custom value may be changed immediately after the optional device is dismounted from the image forming apparatus 12. However, if the dismounted optional device is mounted to the image forming apparatus 12 before a predetermined time (for example, 3 minutes) elapses, the custom value is changed to the custom value before the optional device is dismounted. Next, a series of processing until a standard printing condition is set according to custom data are described.

In the information processing device 14, when installation of a printer driver is started, an acquisition destination of custom data is selected. However, an image forming apparatus 12 controllable by the printer driver is set as the acquisition destination.

Specifically, an image forming apparatus 12 that is communicably connected to the information processing device 14 and operates in response to an instruction from the printer driver is set as the acquisition destination.

For example, when installation of a printer driver is started, an acquisition destination selection screen 120, which is a screen for selecting an acquisition destination of custom data, is displayed on the display 72.

Figure 6:
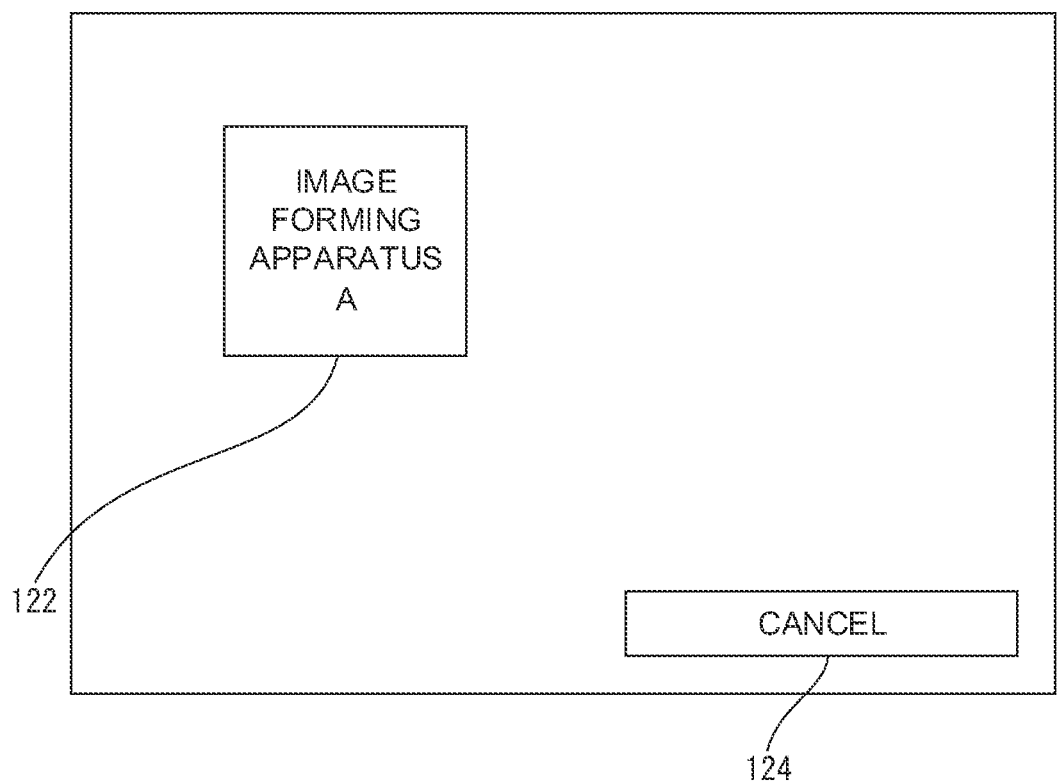
FIG. 6 is a diagram illustrating one example of an acquisition destination selection screen to be displayed on the display of the information processing device.

FIG. 6 is one example of the acquisition destination selection screen 120. A device selection key 122 and a cancel key 124 are provided on the acquisition destination selection screen 120.

The device selection key 122 is provided to select an image forming apparatus 12 that stores custom data from among the image forming apparatuses 12 controllable by the printer driver.

A function of acquiring custom data from a predetermined acquisition destination is assigned to the device selection key 122.

When the device selection key 122 is operated, custom data are acquired in the information processing device 14 from an acquisition destination associated with the device selection key 122 operated on the information processing device 14, in other words, the image forming apparatus 12.

Further, the custom data acquired in the information processing device 14 are stored in the information processing device 14. Thus, a standard printing condition is set according to the custom data.

Specifically, an output instruction (output command) to output custom data is transmitted to the image forming apparatus 12 being an acquisition destination of the custom data.

The image forming apparatus 12 outputs (transmits) the custom data to a transmission source of the output command in response to receiving the output command.

The cancel key 124 is provided to cancel acquisition of custom data.

A function of finishing selecting an acquisition destination of custom data is assigned to the cancel key 124.

When the cancel key 124 is operated, acquisition of custom data is cancelled. Thus, a standard printing condition is set according to original data.

Figure 7:
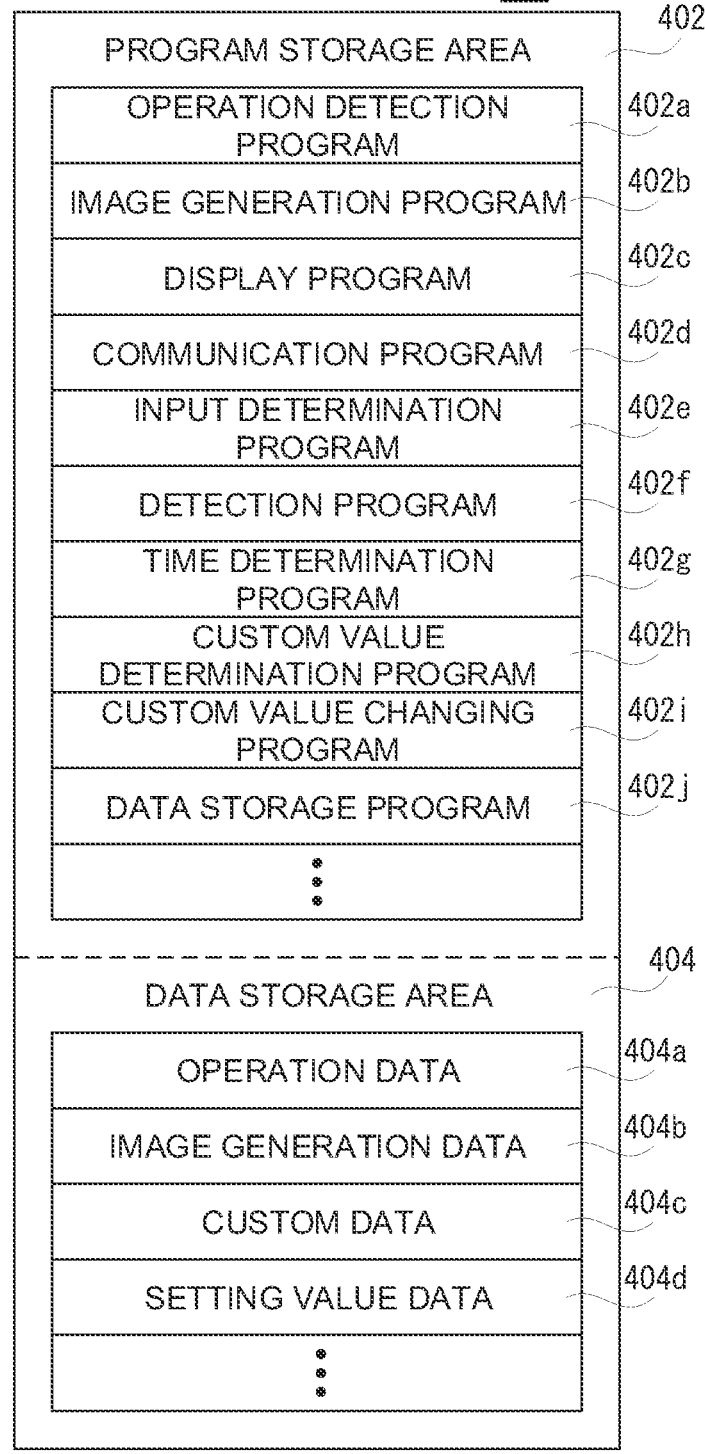
FIG. 7 is a diagram illustrating one example of a memory map of an RAM in the image forming apparatus.

FIG. 7 is a diagram illustrating one example of a memory map 400 of the RAM 24 in the image forming apparatus 12 illustrated in FIG. 1. As illustrated in FIG. 7, the RAM 24 includes a program storage area 402 and a data storage area 404. Further, a control program of the image forming apparatus 12 is stored in the program storage area 402 of the RAM 24 as one example of an information processing program.

The control program of the image forming apparatus 12 includes an operation detection program 402a, an image generation program 402b, a display program 402c, a communication program 402d, an input determination program 402e, a detection program 402f, a time determination program 402g, a custom value determination program 402h, a custom value changing program 402i, and a data storage program 402j.

The operation detection program 402a is a program for detecting operation detection data associated with an operation with respect to each operation unit of the image forming apparatus 12. For example, when the touch panel 34 is touched, the CPU 20 acquires, as operation data 404a to be described later, touch coordinate data output from the touch panel 34 according to the operation detection program 402a, and stores the operation data 404a in a buffer. Further, when a button or a key of hardware included in the image forming apparatus 12 is pressed or operated, the CPU 20 acquires the operation data 404a by pressing or operating the button or the key according to the operation detection program 402a, and stores the operation data 404a in a buffer.

The image generation program 402b is a program for generating display images for displaying various screens by controlling the GPU and using the image generation data 404b to be described later.

Further, the display program 402c is a program for outputting, to the display 32, a display image generated according to the image generation program 402b.

The communication program 402d is a program for controlling the communication unit 40 and communicating with an external device.

The communication program 402d is also a program for controlling the communication unit 40 and communicating with a medium.

The input determination program 402e is a program for determining whether custom data have been input to an own machine (own apparatus) according to the communication program 402d.

The detection program 402f is a program for controlling the detection unit 42 and detecting that an optional device has been dismounted from the image forming apparatus 12.

The detection program 402f is also a program for detecting that an optional device has been mounted to the image forming apparatus 12.

The time determination program 402g is a program for determining whether a predetermined time has elapsed since dismounting of an optional device was detected according to the detection program 402f.

The custom value determination program 402h is a program for determining whether a custom value indicated by custom data is a custom value that can be achieved by the own apparatus by referring to setting value data 404d in response to input of the custom data to the image forming apparatus 12.

Further, the custom value determination program 402h is a program for determining whether a custom value indicated by custom data is a custom value that cannot be achieved by the own apparatus by referring to the setting value data 404d in response to input of the custom data to the image forming apparatus 12.

Further, the custom value determination program 402h is also a program for determining whether a custom value indicated by custom data is a custom value that can be achieved by the own apparatus, when it is determined that a predetermined time has elapsed according to the time determination program 402g.

Furthermore, the custom value determination program 402h is also a program for determining whether a custom value indicated by custom data is a custom value that cannot be achieved by the own apparatus, when it is determined that a predetermined time has elapsed according to the time determination program 402g.

The custom value changing program 402i is a program for changing a custom value that cannot be achieved by the own apparatus to a custom value that can be achieved by the own apparatus, based on the setting value data 404d, when a custom value indicated by custom data is determined to be the custom value that cannot be achieved by the own apparatus according to the custom value determination program 402h.

The data storage program 402j is a program for storing custom data, when the custom data are input to the image forming apparatus 12, and a custom value indicated by the custom data is determined to be a custom value that can be achieved by the own apparatus according to the custom value determination program 402h.

Further, the data storage program 402j is a program for storing custom data, when the custom data are input to the image forming apparatus 12, and a custom value indicated by the custom data is changed according to the custom value changing program 402i.

Although not illustrated, the program storage area 402 also stores another program and the like necessary for controlling the image forming apparatus 12.

The operation data 404a, the image generation data 404b, custom data 404c, and the setting value data 404d are stored in the data storage area 404.

The operation data 404a are operation data detected according to the operation detection program 402a, and are stored chronologically. The operation data 404a are deleted after having been used for processing by the CPU 20.

The image generation data 404b are data including polygon data, texture data, and the like for generating a display image. The image generation data 404b also include image data and the like associated with a software key.

The custom data 404c are data indicating a custom value to be stored in the own apparatus. The setting value data 404d are data indicating a setting value that can be achieved by the own apparatus.

Although not illustrated, the data storage area 404 stores other data necessary for executing the information processing program, and also includes flags and counters (timers) necessary for executing the information processing program.

Figure 8:
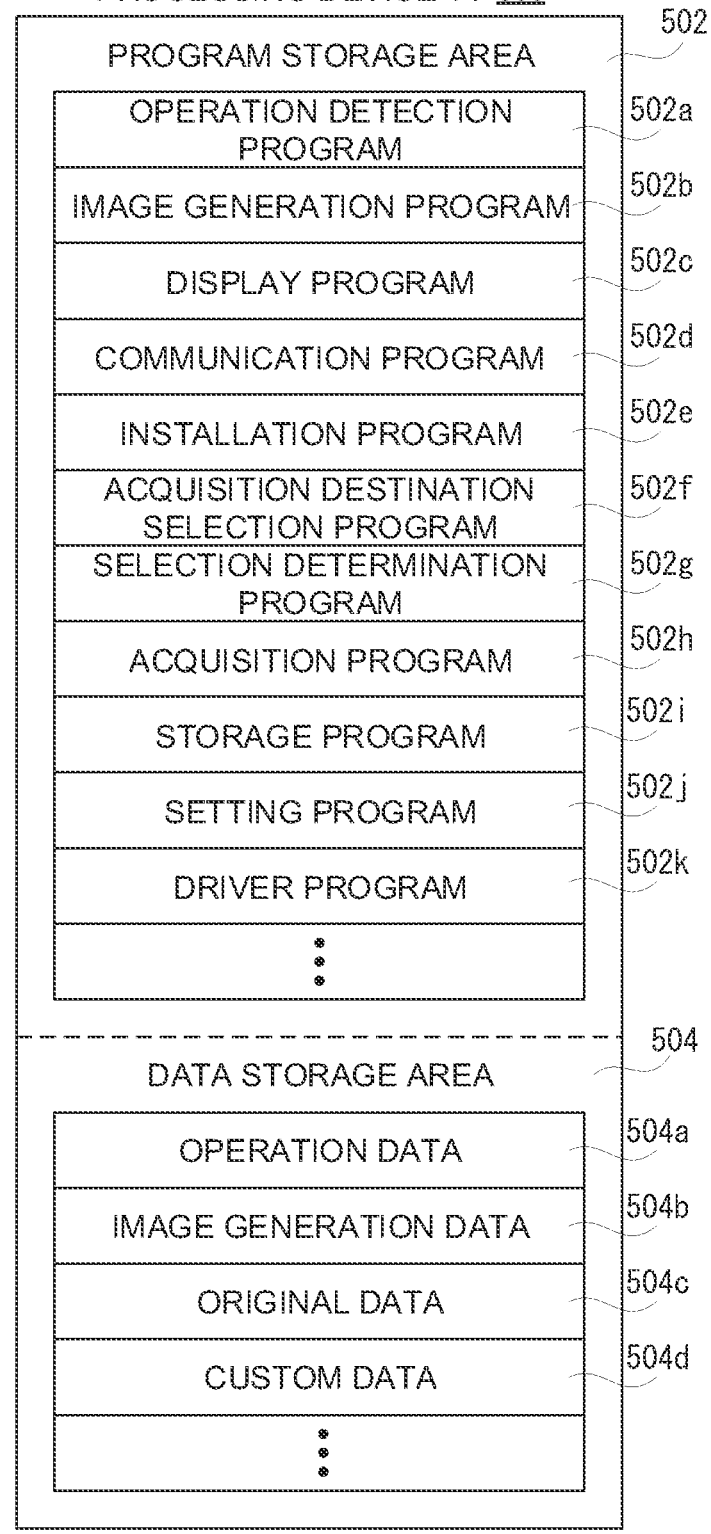
FIG. 8 is a diagram illustrating one example of a memory map of an RAM in the information processing device.

FIG. 8 is a diagram illustrating one example of a memory map 500 of the RAM 64 in the information processing device 14 illustrated in FIG. 1. As illustrated in FIG. 7, the RAM 64 includes a program storage area 502 and a data storage area 504. Further, a control program of the information processing device 14 is stored in the program storage area 502 of the RAM 64 as one example of the information processing program.

The control program of the information processing device 14 includes an operation detection program 502a, an image generation program 502b, a display program 502c, a communication program 502d, an installation program 502e, an acquisition destination selection program 502f, a selection determination program 502g, an acquisition program 502h, a storage program 502i, a setting program 502j, and a driver program 502k.

The operation detection program 502a is a program for detecting operation detection data associated with an operation with respect to each operation unit of the information processing device 14. For example, when the operation unit 74 is operated, the CPU 60 acquires, as operation data 504a to be described later, touch coordinate data output from the operation unit 74 according to the operation detection program 502a, and stores the operation data 504a in a buffer. When a button or a key of hardware other than the operation unit 74 is pressed or operated, the CPU 60 acquires the operation data 504a by pressing or operating the button or the key according to the operation detection program 502a, and stores the operation data 504a in a buffer.

The image generation program 502b is a program for generating display images for displaying various screens by controlling the GPU and using the image generation data 504b to be described later.

The display program 502c is a program for outputting, to the display 72, a display image generated according to the image generation program 502b.

The communication program 502d is a program for controlling the communication unit 76 and communicating with an external device.

The installation program 502e is a program for installing a printer driver.

The acquisition destination selection program 502f is a program for selecting an acquisition destination of custom data according to a user operation, when a printer driver is installed according to the installation program 502e.

The selection determination program 502g is a program for determining whether an acquisition destination of custom data is selected according to the acquisition destination selection program 502f.

The acquisition program 502h is a program for acquiring custom data from an acquisition destination, when the acquisition destination of the custom data is selected according to the selection determination program 502g.

The storage program 502i is a program for storing custom data in the storage unit 66, when the custom data are acquired according to the acquisition program 502h.

Further, the storage program 502i includes a program for storing original data in the storage unit 66, when a printer driver is installed according to the installation program 502e.

The setting program 502j is a program for setting a standard printing condition for a printer driver according to custom data, when the custom data are stored in the storage unit 66 according to the storage program 502i.

Further, the setting program 502j includes a program for setting a standard printing condition for a printer driver according to original data, when only the original data are stored in the storage unit 66 according to the storage program 502i.

The driver program 502k is a program equivalent to a printer driver.

Although not illustrated, another program, and the like necessary for controlling the information processing device 14 are also stored in the program storage area 502.

The operation data 504a, the image generation data 504b, original data 504c, and custom data 504d are stored in the data storage area 504.

The operation data 504a are operation data detected according to the operation detection program 502a, and are stored chronologically. The operation data 504a are deleted after having been used for processing by the CPU 60.

The image generation data 504b are data including polygon data, texture data, and the like for generating a display image. The image generation data 404b also include image data and the like associated with a software key.

The original data 504c are data indicating an original value. Further, the custom data 504d are custom data acquired from the image forming apparatus 12. Therefore, the custom data 504d are equivalent to the custom data 404c.

Although not illustrated, the data storage area 504 stores other data necessary for executing the information processing program, and also includes flags and counters (timers) necessary for executing the information processing program.

Figure 9:
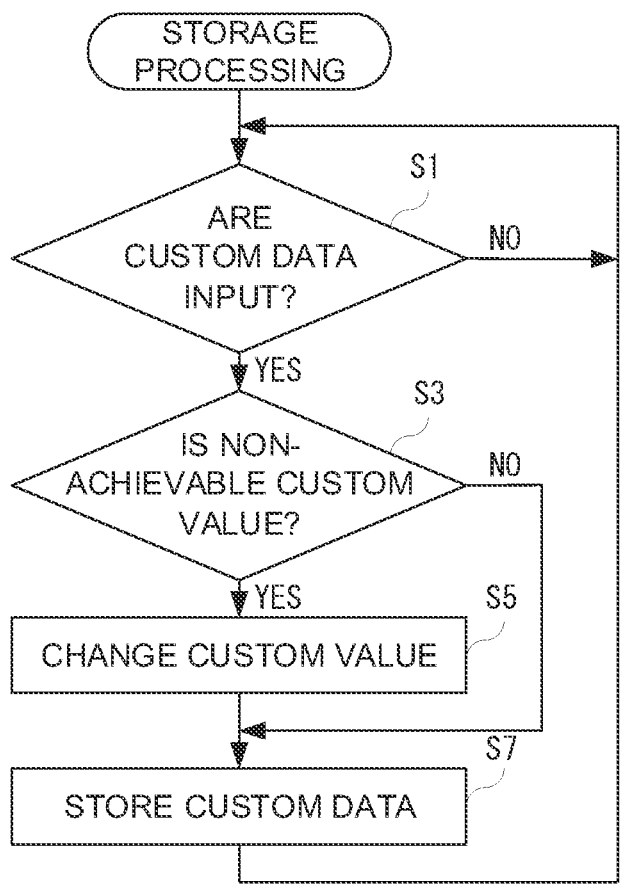
FIG. 9 is a flowchart illustrating one example of storage processing of a CPU in the image forming apparatus.

FIG. 9 is a flowchart illustrating one example of storage processing of the CPU 20 in the image forming apparatus 12. The CPU 20 starts the storage processing, for example, in response to turning on of a main power supply.

In step S1, it is determined whether custom data have been input to the own apparatus. When the determination result is "NO" in step S1, in other words, when custom data have not been input to the own apparatus, the processing returns to step S1. On the other hand, when the determination result is "YES" in step S1, in other words, when custom data have been input to the own apparatus, the processing proceeds to step S3.

In step S3, it is determined whether the custom value indicated by the custom data is a custom value that cannot be achieved by the own apparatus. When the determination result is "NO" in step S3, in other words, when the custom value is a custom value that can be achieved by the own apparatus, the processing proceeds to step S7. When the determination result is "YES" in step S3, in other words, when the custom value is a custom value that cannot be achieved by the own apparatus, in step S5, the custom value that cannot be achieved by the own apparatus is changed to a custom value that can be achieved by the own apparatus, and the processing proceeds to step S7.

In step S7, the custom data are stored in the storage unit 26, and the processing returns to step S1.

Figure 10:
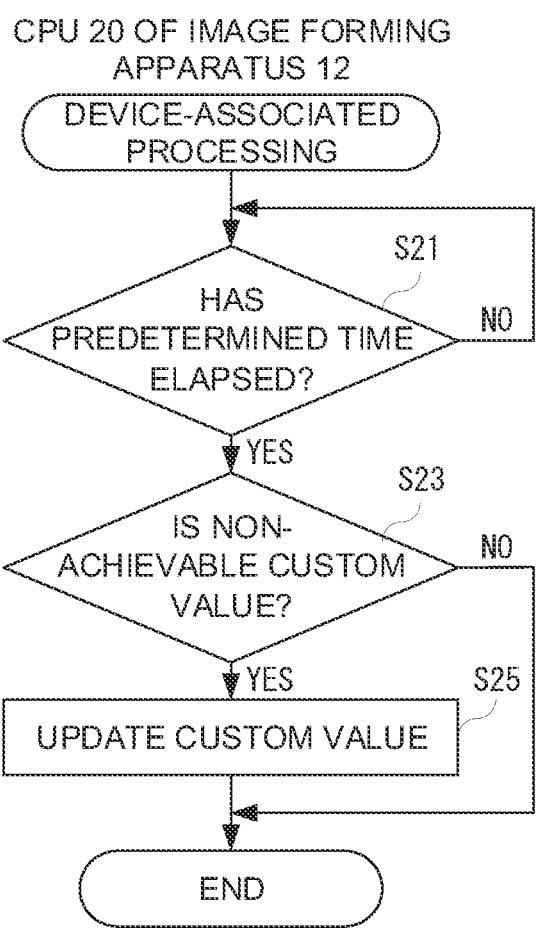
FIG. 10 is a flowchart illustrating one example of device-associated processing of the CPU in the image forming apparatus.

FIG. 10 is a flowchart illustrating one example of device-associated processing of the CPU 20 in the image forming apparatus 12. The CPU 20 starts the device-associated processing, for example, when dismounting of an optional device is detected.

In step S21, it is determined whether a predetermined time has elapsed since dismounting of the optional device was detected. When the determination result is "NO" in step S21, in other words, when the predetermined time has not elapsed, the processing returns to step S21. On the other hand, when the determination result is "YES" in step S21, in other words, when the predetermined time has elapsed, the processing proceeds to step S23.

In step S23, it is determined whether the custom value indicated by the custom data is a custom value that cannot be achieved by the own apparatus. When the determination result is "NO" in step S23, in other words, when the custom value is a custom value that can be achieved by the own apparatus, the device-associated processing is ended. On the other hand, when the determination result is "YES" in step S23, in other words, when the custom value is a custom value that cannot be achieved by the own apparatus, the custom value that cannot be achieved by the own apparatus is changed to a custom value that can be achieved by the own apparatus in step S25, and the device-associated processing is ended.

Figure 11:
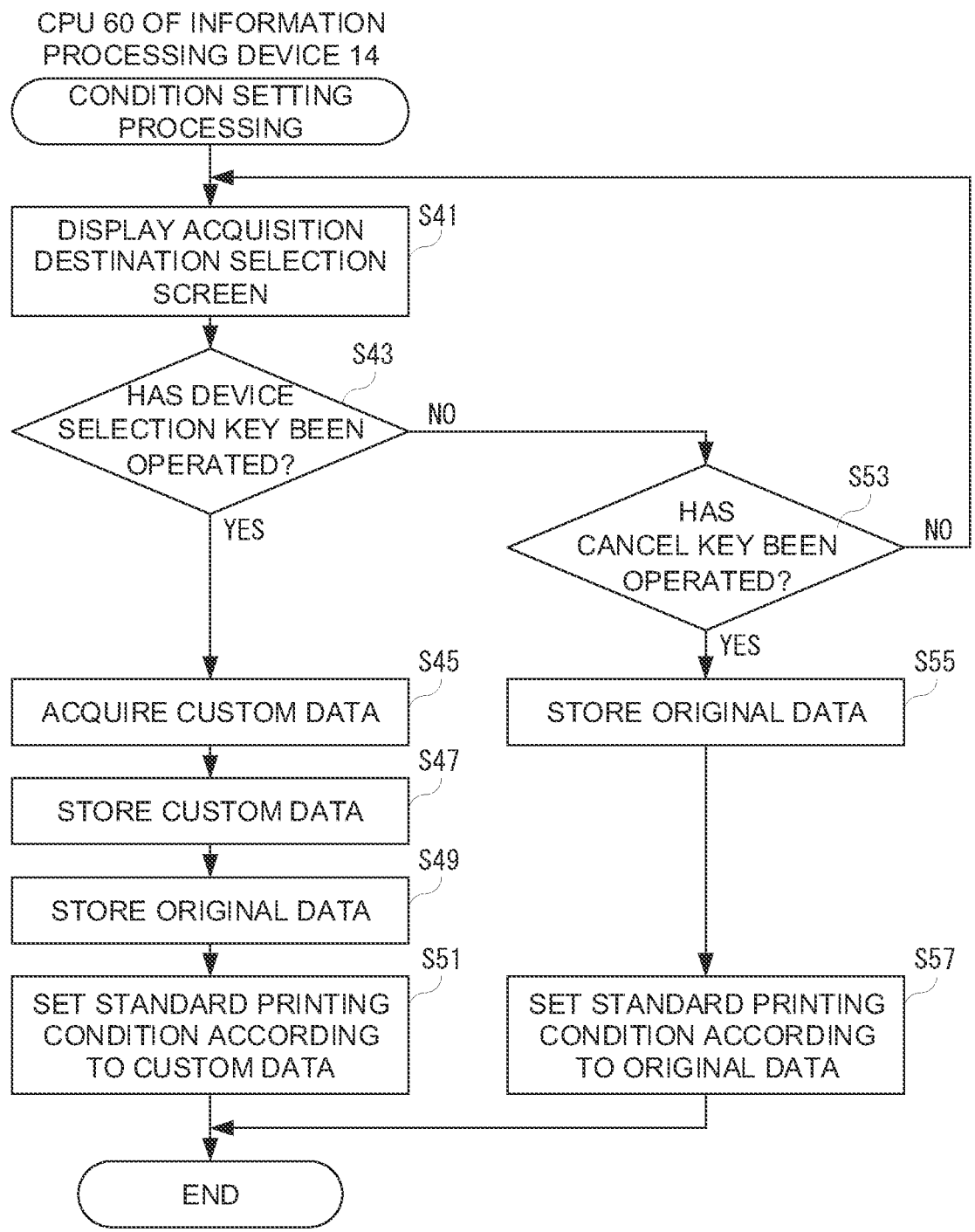
FIG. 11 is a flowchart illustrating one example of condition setting processing of a CPU in the information processing device.

FIG. 11 is a flowchart illustrating one example of condition setting processing of the CPU 60 in the information processing device 14. The CPU 60 starts the condition setting processing, for example, in response to start of installation of a printer driver.

In step S41, the acquisition destination selection screen 120 is displayed on the display 72, and in step S43, it is determined whether the device selection key 122 has been operated. Herein, it is determined whether an acquisition destination of custom data has been selected.

When the determination result is "NO" in step S43, in other words, when the device selection key 122 has not been operated, the processing proceeds to step S53. On the other hand, when the determination result is "YES" in step S43, in other words, when the device selection key 122 has been operated, the processing proceeds to step S45.

In step S45, the custom data are acquired, and in step S47, the custom data are stored.

In step S49, original data are stored, and in step S51, a standard printing condition is set according to the custom data. When the standard printing condition is set in step S51, the condition setting processing is ended.

In step S53, it is determined whether the cancel key 124 has been operated. Herein, it is determined whether acquisition of the custom data has been cancelled.

When the determination result is "NO" in step S53, in other words, when the cancel key 124 has not been operated, the processing returns to step S41. On the other hand, when the determination result is "YES" in step S53, in other words, when the cancel key 124 has been operated, the processing proceeds to step S55.

In step S55, the original data are stored, and in step S57, a standard printing condition is set according to the original data. When the standard printing condition is set in step S57, the condition setting processing is ended.

In the first embodiment, it is possible to save time and effort involved in eliminating an inconvenience, when a printer driver is installed.

Second Embodiment

Since a second embodiment is similar to the first embodiment except that a custom value can be set in an image forming apparatus 12, overlapping description is omitted.

In the image forming apparatus 12 according to the second embodiment, for example, when a main power supply is turned on, a home screen 140, which is a main menu screen of the image forming apparatus 12, is displayed on a display 32.

Figure 12:
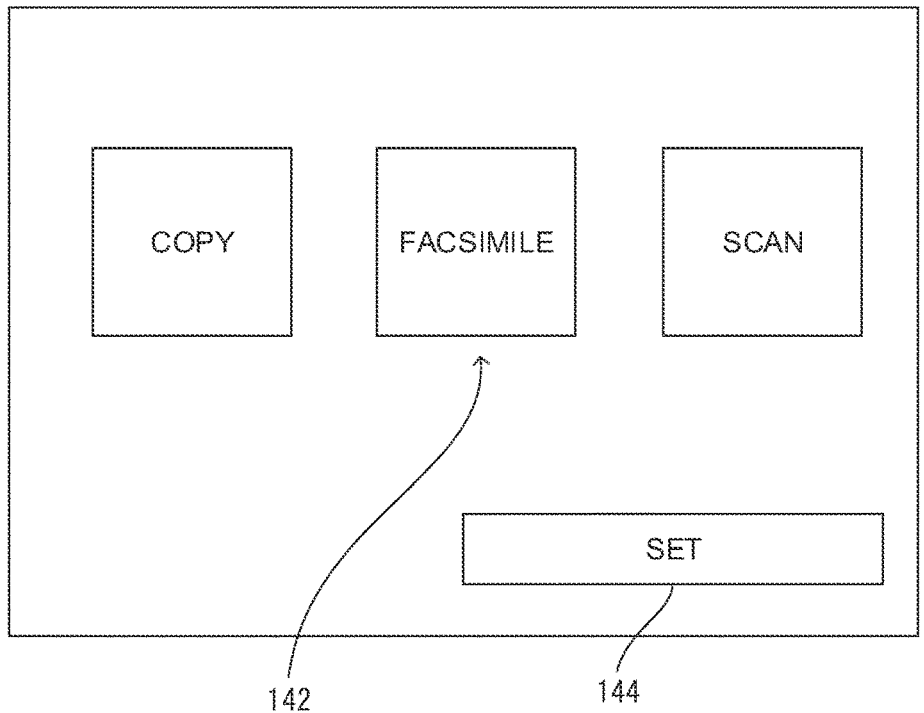
FIG. 12 is a diagram illustrating one example of a home screen to be displayed on a display of an image forming apparatus according to a second embodiment.

FIG. 12 is one example of the home screen 140. The home screen 140 is provided with a plurality of function selection keys 142 and a setting key 144.

The plurality of function selection keys 142 are provided to select a copy function, a facsimile function, and a scan function of the image forming apparatus 12.

The plurality of function selection keys 142 are assigned with a function of displaying, on the display 32, an operation screen associated with any of the copy function, the facsimile function, and the scan function.

When a predetermined function selection key 142 is operated, an operation screen of a function associated with the operated function selection key 142 is displayed on the display 32.

The setting key 144 is provided to perform various settings of the image forming apparatus 12. The setting key 144 is assigned with a function of displaying, on the display 32, an operation screen (setting screen) for performing various settings of the image forming apparatus 12. When the setting key 144 is operated, a setting screen is displayed on the display 32.

In the second embodiment, as the setting screen, a custom screen 160, which is a screen for setting a custom value, is displayed on the display 32.

Figure 13:
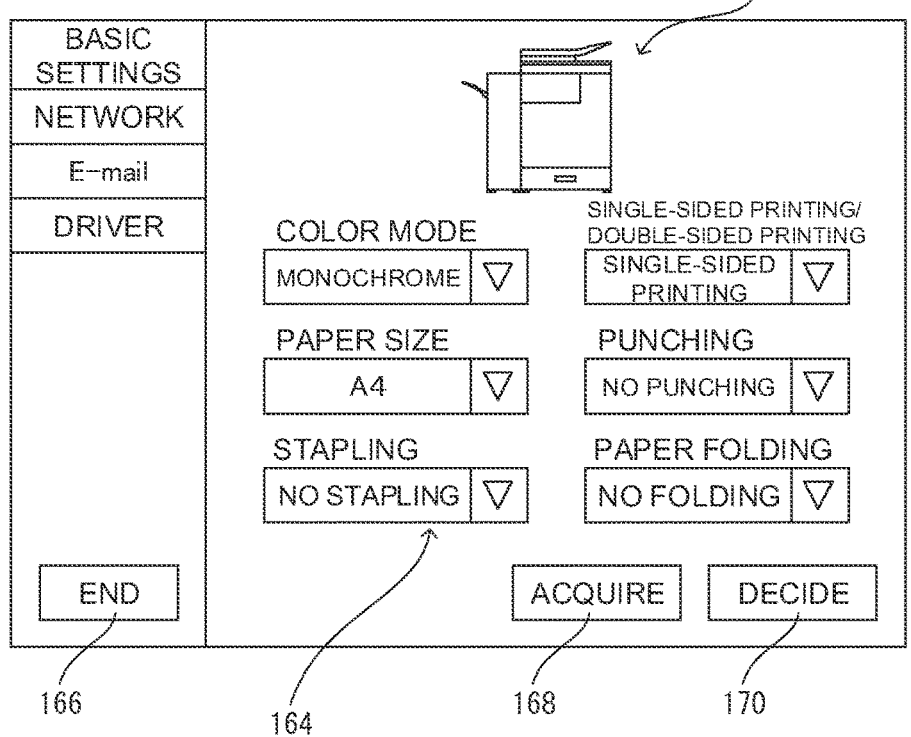
FIG. 13 is a diagram illustrating one example of a custom screen to be displayed on the display of the image forming apparatus according to the second embodiment.

FIG. 13 is one example of the custom screen 160. A schematic view 162 of the image forming apparatus 12 as viewed from the front side is displayed on the custom screen 160.

Further, a plurality of item keys 164, an end key 166, an acquisition key 168, and a decision key 170 are provided on the custom screen 160.

The plurality of item keys 164 are provided to set a custom value of each setting item.

A function of setting a custom value of a predetermined setting item is assigned to each of the plurality of item keys 164.

When a predetermined item key 164 is operated, a custom value associated with the operated item key 164 is set.

Specifically, an unillustrated pull-down menu is displayed on the display 32, and a custom value is set according to a user operation. Note that a setting content associated with the custom value is displayed in each of the plurality of item keys 164.

However, setting to a custom value that cannot be achieved by the own apparatus is constrained on the custom screen 160. For example, an alternative associated with a custom value that cannot be achieved by the own apparatus is not displayed on the pull-down menu. In addition, an operation to the alternative associated with the custom value that cannot be achieved by the image forming apparatus 12 is invalidated.

The end key 166 is provided to finish setting of a custom value. The end key 166 is assigned with a function of displaying, on the display 32, an operation screen other than a setting screen.

When the end key 166 is operated, for example, the home screen 140 is displayed on the display 32.

The acquisition key 168 is provided to acquire custom data from the outside. The acquisition key 168 is assigned with a function of displaying, on the display 32, an operation screen for acquiring custom data from the outside.

When the acquisition key 168 is operated, an acquisition screen 180 (see FIG. 14) is displayed on the display 32.

The decision key 170 is provided to finish setting of a custom value. The decision key 170 is assigned with a function of generating custom data.

When the decision key 170 is operated, custom data are generated according to a set custom value, and stored in the image forming apparatus 12.

Figure 14:
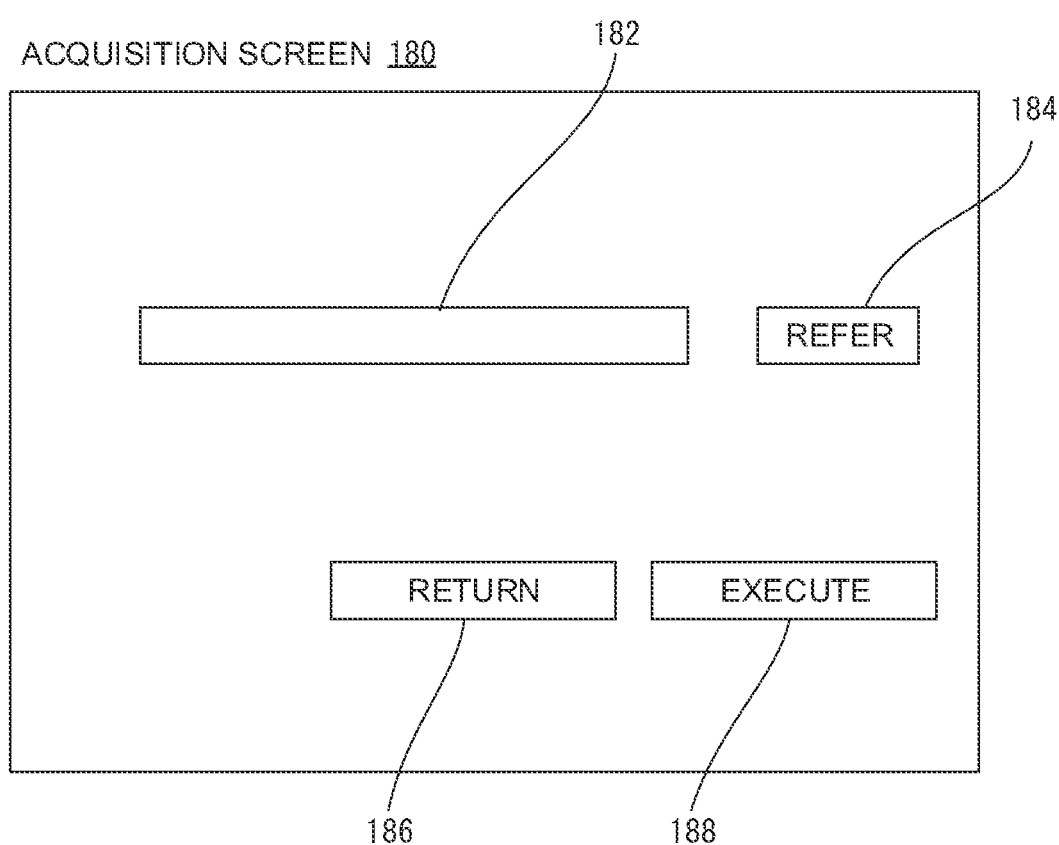
FIG. 14 is a diagram illustrating one example of an acquisition screen to be displayed on the display of the image forming apparatus according to the second embodiment.

FIG. 14 is one example of the acquisition screen 180. The acquisition screen 180 is a screen for acquiring custom data from the outside.

The acquisition screen 180 includes a display area 182 indicating an acquisition destination of custom data. Further, a reference key 184, a return key 186, and an execution key 188 are provided on the acquisition screen 180.

The reference key 184 is provided to refer to an acquisition destination of custom data. The reference key 184 is assigned with a function of presenting a user a list of acquisition destinations of custom data.

When the reference key 184 is operated, for example, an unillustrated pop-up screen is displayed on the display 32.

A list of external devices (for example, general-purpose servers), which are acquisition destinations of custom data, is displayed on the pop-up screen, and an acquisition destination of the custom data is selected according to a user operation.

Further, when the acquisition destination of the custom data is selected, the pop-up screen is hidden, and a character string indicating the acquisition destination is displayed in the display area 182.

Further, a medium storing the custom data may be set as the acquisition destination.

The return key 186 is provided to return to a previous screen. The return key 186 is assigned with a function of displaying a previous screen on the display 32.

When the return key 186 is operated, the custom screen 160 is displayed on the display 32.

The execution key 188 is provided to acquire custom data. The execution key 188 is assigned with a function of acquiring custom data from a predetermined acquisition destination.

When the execution key 188 is operated, custom data are input to the image forming apparatus 12.

Further, when custom data are input to the image forming apparatus 12, the custom data are stored in the image forming apparatus 12 as described above.

When an acquisition destination of custom data is not selected, the operation to the execution key 188 is invalidated.

Further, when the execution key 188 is operated, and custom data are acquired in the image forming apparatus 12, the home screen 140 is displayed on the display 32.

Figure 15:
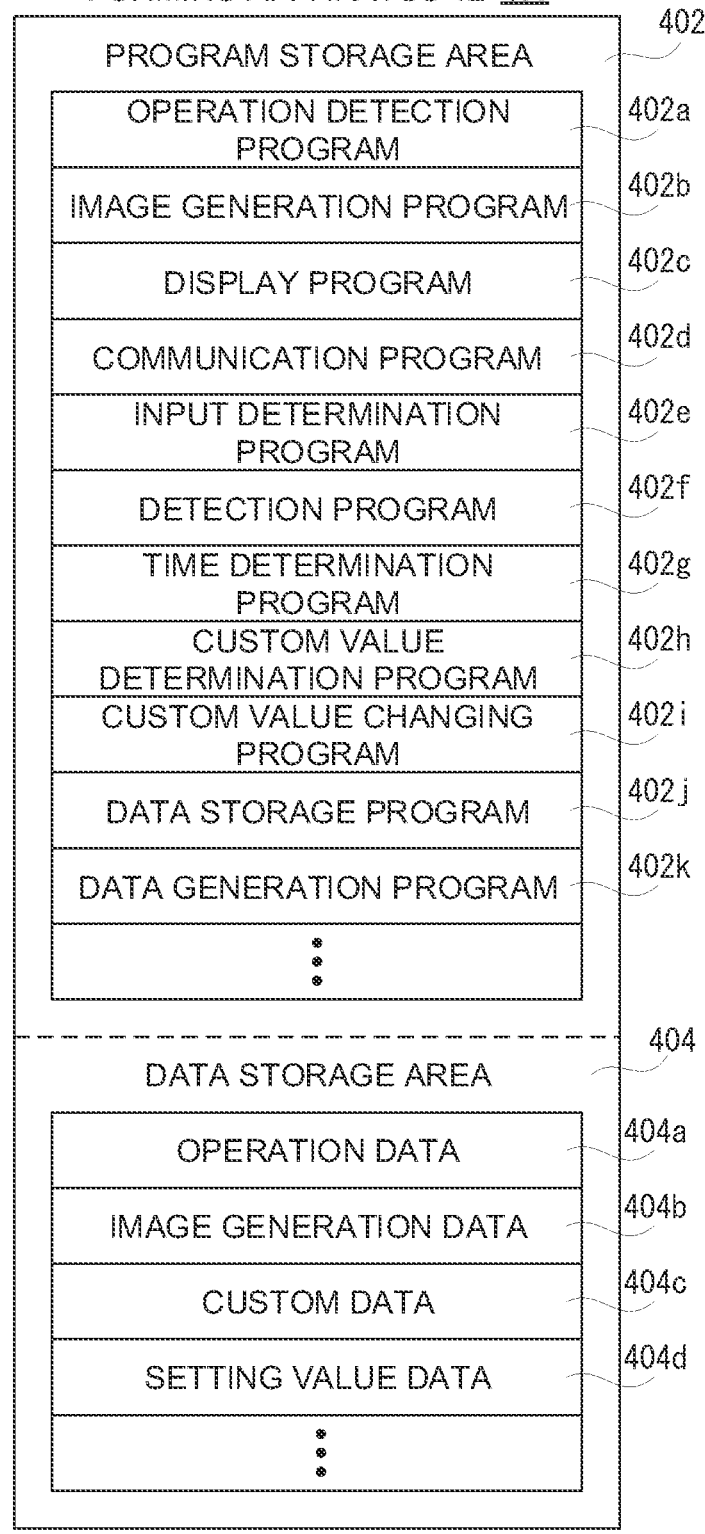
FIG. 15 is a diagram illustrating one example of a memory map of an RAM in the image forming apparatus according to the second embodiment.

FIG. 15 is a diagram illustrating one example of a memory map 400 of an RAM 24 in the image forming apparatus 12 according to the second embodiment.

A control program of the image forming apparatus 12 according to the second embodiment additionally includes a data generation program 402$k$.

The data generation program 402$k$ is a program for generating custom data, when a predetermined user operation is detected according to an operation detection program 402$a$.

FIG. 16 is a flowchart illustrating one example of generation processing of a CPU 20 in the image forming apparatus 12. The CPU 20 starts the generation processing in response to, for example, displaying of the custom screen 160 on the display 32.

In step S71, it is determined whether the decision key 170 has been operated. When the determination result is "NO" in step S71, in other words, when the decision key 170 has not been operated, the processing proceeds to step S77. On the other hand, when the determination result is "YES" in step S71, in other words, when the decision key 170 has been operated, custom data are generated in step S73. In step S75, the generated custom data are stored, and the generation processing is ended.

In step S77, it is determined whether a screen other than the custom screen 160 is displayed on the display 32. When the determination result is "NO" in step S77, in other words, when no screen other than the custom screen 160 is displayed on the display 32, the processing returns to step S71. On the other hand, when the determination result is "YES" in step S77, in other words, when a screen other than the custom screen 160 is displayed on the display 32, the generation processing is ended.

In the second embodiment, custom data can be generated in the image forming apparatus 12 without a customization tool. Specifically, it is possible to save time and effort of preparing a customization tool in advance.

In the image forming apparatus 12, it may be notified that a setting content of a setting item has been changed in response to changing of a custom value that cannot be achieved by the own apparatus to a custom value that can be achieved by the own apparatus. For example, when the custom value of the color mode is changed, it is notified that the color mode has been changed from "color" to "black and white (monochrome)".

Specifically, a message for notifying that a setting content has been changed is displayed on the display 32. The notification method is not particularly limited.

Thus, it is possible to notify the user that a setting content of a setting item has been changed.

Each of the above-described embodiments is one example, and can be changed as necessary in an actual product. Furthermore, the flowchart illustrated in each of the above-described embodiments is one example, and the order of steps can be optionally changed, when the same advantageous effect can be acquired.

What is claimed is:

1. A printing system provided with an image forming apparatus and an information processing device,
   the image forming apparatus comprising:
   a first communicator that communicates with the information processing device;
   a first determinator that determines, when custom data is input, whether a custom value indicated by the custom data is realizable by the image forming apparatus; and
   a first storage that stores a setting value of a printing condition, wherein:
   when the first determinator determines that the custom value is realizable by the image forming apparatus, the custom data is stored as the setting value; and
   when the first determinator determines that the custom value is not realizable by the image forming apparatus, substitute custom data that is realizable and stored as the setting value; and
   the information processing device comprising:
   a second communicator that communicates with the image forming apparatus;
   an installer that installs a printer driver for controlling the image forming apparatus;
   a display that displays a selection screen for selecting the image forming apparatus that is aquation destination for acquiring the setting value when the printer driver is installed by the installer;

a data acquirer that acquires, when the image forming apparatus is selected on the selecting screen, the setting value from the image forming apparatus that is selected;

a second storage that stores the setting value acquired by the data acquirer and an original value, or stores the original value when selection of the image forming apparatus is canceled; and a setter that sets a standard value of a printing condition for the printer driver according to the setting value stored in the second storage when the image forming apparatus is selected on the selection screen, or sets the standard value of the printing condition for the printer driver according to the original value stored in the second storage when the selection of the image forming apparatus is canceled.

2. The printing system according to claim 1, wherein the image forming apparatus further comprises a second determinator that determines whether the custom value is realizable by the image forming apparatus when a dismounting of an optional device is detected, and the first storage stores a changed custom value that is obtained by changing the custom value to a custom value that is realizable by the image forming apparatus as the setting value of the printing condition when the second determinator determines that the custom value is not realizable by the image forming apparatus.

3. The printing system according to the claim 1, wherein the display is a first display, the image forming apparatus further comprises a second display that displays a setting screen for setting the custom value according to a user operation, and the first storage stores the custom value set in the setting screen as the setting value.

4. A printing system provided with an image forming apparatus and an information processing device, wherein:

a control method of the image forming apparatus comprises:
(a) communicating with the information processing device;
(b) determining, when custom data is input, whether a custom value indicated by the custom data is realizable by the image forming apparatus; and
(c) storing a setting value of a printing condition, wherein:
upon determining that the custom value is realizable by the image forming apparatus, the custom data is stored as the setting value; and
upon determining that the custom value is not realizable by the image forming apparatus, substitute custom data that is realizable and stored as the setting value; and a control method of the information processing device comprises:
(d) communicating with the image forming apparatus;
(e) installing a printer driver for controlling the image forming apparatus;
(f) displaying a selection screen for selecting the image forming apparatus that is aquation destination for acquiring the setting value, when the printer driver is installed in (d);
(g) acquiring, when the image forming apparatus is selected on the selection screen, the setting value from the image forming apparatus being selected;
(h) storing the setting value acquired in (g) and an original value, or the original value when selection of the image forming apparatus is canceled; and
(i) setting a standard value of a printing condition for the printer driver according to the setting value stored in (h) when the image forming apparatus is selected on the selection screen, or the standard value of a printing condition for the printer driver according to the original value stored in (h) when the selection of the image forming apparatus is canceled.

5. The printing system according to claim 4, wherein the control method of the image forming apparatus further comprises
(j) determining whether the custom value is realizable by the image forming apparatus when a dismounting of an optional device is detected, and
(c) stores a changed custom value that is obtained by changing the custom value to a custom value that is realizable by image forming apparatus as the setting value of the printing condition upon determining that the custom value is not realizable by the image forming apparatus in (j).

* * * * *